United States Patent
Gipson et al.

(10) Patent No.: US 6,819,228 B2
(45) Date of Patent: Nov. 16, 2004

(54) SCANNING BRAILLE PRESENTATION

(76) Inventors: Dwain Gipson, 1651 Whitewood Ct., #A, Corona, CA (US) 92882; Lawrence E. Jenkins, 2313 Hillside Ave., Norco, CA (US) 92860

( * ) Notice: Subject to any disclaimer, the term of this patent is extended or adjusted under 35 U.S.C. 154(b) by 0 days.

(21) Appl. No.: 10/352,651

(22) Filed: Jan. 28, 2003

(65) Prior Publication Data

US 2004/0145455 A1 Jul. 29, 2004

(51) Int. Cl.[7] .................................................. H04B 3/36
(52) U.S. Cl. ....................... 340/407.1; 345/31; 434/112; 434/113
(58) Field of Search ........................... 340/407.1; 345/30, 345/31, 55; 434/112, 113; 400/283

(56) References Cited

U.S. PATENT DOCUMENTS

| | | |
|---|---|---|
| 909,444 A | 1/1909 | Newell |
| 1,049,240 A | 12/1912 | Janecek |
| 3,109,168 A | 10/1963 | Abendroth |
| 3,199,098 A | 8/1965 | Schwartz |
| 3,267,455 A | 8/1966 | McGuire et al. |
| 3,949,392 A | 4/1976 | Caritato |
| 4,006,476 A | 2/1977 | Romney |
| 4,021,946 A | 5/1977 | Bradshaw |
| 4,079,825 A * | 3/1978 | Fewell ..................... 400/109.1 |
| 4,197,527 A | 4/1980 | Romney |
| 4,211,497 A * | 7/1980 | Montgomery ............... 400/486 |
| 4,214,390 A | 7/1980 | Kluiters |
| 4,694,289 A | 9/1987 | Kent |
| 4,775,862 A | 10/1988 | Kent |
| 4,912,442 A | 3/1990 | Black |
| 5,195,894 A * | 3/1993 | le Blanc et al. ............. 434/114 |

* cited by examiner

*Primary Examiner*—Julie Lieu
(74) *Attorney, Agent, or Firm*—Gene Scott; Patent Law & Venture Group

(57) ABSTRACT

A Braille reading apparatus has a base unit presenting a planar upfacing surface and a traveling Braille character carriage. A cover unit is engaged with the base unit and provides a flexible membrane covering the upfacing surface and the carriage. The character carriage is enabled for moving across the base unit and provides plural character read units in linear sequence between its opposing ends. Each of the read units provides Braille character presentation in contact with an underside of the membrane, whereby, a page of Braille is readable through tactile contact, moving between the opposing ends of the character carriage over an outside surface of the membrane, as the character carriage moves over the base unit scanning from one end to the other.

7 Claims, 3 Drawing Sheets

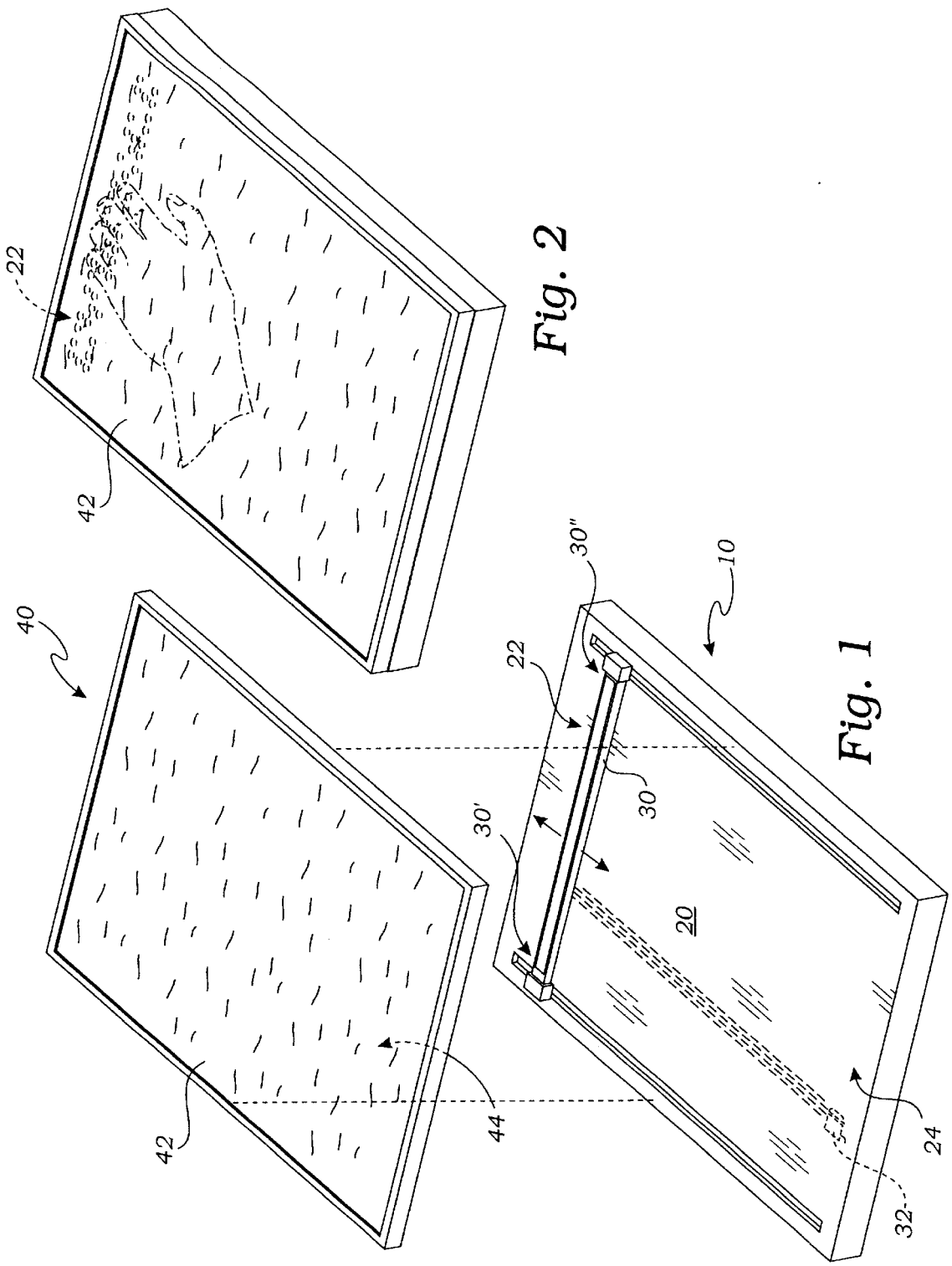

SCANNING BRAILLE PRESENTATION

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to Braille displays and more particularly to such a display providing a scanning carriage of Braille character units adapted for programming using electrical circuits.

2. Description of Related Art

The following art defines the present state of this field:

Newell, U.S. Pat. No. 909,444 describes a stipple member comprising a body portion provided with a plurality of closely spaced transverse holes, and a plurality of stipples therefor each provided with a head having a conical reduction at the rear portion and a reduced stem portion.

Janecek, U.S. Pat. No. 1,049,240 describes a display apparatus comprising a board formed with a plurality of inclined openings, pistons slidably arranged in the inclined openings, pneumatic means for individually sliding the pistons toward the free outer end of the openings, said means including sliding valves, means for holding the valves in open position; and means in the inclined openings for limiting the outward movement of the sliding pistons.

Abendroth, U.S. Pat. No. 3,109,168 describes a changeable indicator for a character display unit comprising, a frame, a ball indicator mounted for rotary movement on said frame, said indicator having a first distinctive identity on one hemisphere and a second distinctive identity on a second hemisphere, an electromagnetic structure having first and second coil windings with central core openings and a movable core member located therein, a gear sector operatively connected to said core member, a pinion gear mounted on said frame in intermeshed relationship with said gear sector operatively connected to said ball indicator, a pair of stop pins mounted on said frame for determining the terminal positions of movement of said gear sector, energizing means for selectively energizing said first and second coil windings of said electromagnetic structure and a spring biased toggle device operated by said gear sector in response to the movement of said core member toward said one selectively energized coil windings to retain said ball indicator in its last operated position as determined by the movement of said gear sector into registry with one of said stop pins when said one selected first and second coil windings is deenergized.

Schwartz, U.S. Pat. No. 3,199,098 describes a variable display system comprising a multiplicity of rods fixed in seriatim in an endless loop that includes a viewing plane; a number of spherical elements mounted on each rod, having hemispheres of contrasting colors, each element having a write gear; means for transporting said rods and elements in such endless loop; and means for engaging the write gears selectively to present the desired hemispheres for display in the viewing plane.

McGuire et al., U.S. Pat. No. 3,267,455 describes a reflective display member comprising, a displaceable element having oppositely disposed portions with different reflective characteristics and including a magnetized element having poles of opposite magnetic polarity each respectively positioned centrally of a respective different reflective portion, a fixed magnetic member positioned contiguous to said displaceable element, said fixed magnetic member coacting with one of the poles of said magnetized element for maintaining said displaceable element in a first stable state wherein one reflective characteristic is visible and coacting with the other pole of said magnetized element for maintaining said displaceable element in a second stable state wherein only the other reflective characteristic is visible, first selectively operable means for establishing a first unidirectional magnetic field to interact with the magnetic field of said magnetized element to cause said displaceable element to be displaced to a transient position intermediate to said first and second states wherein neither of the poles of said magnetized element is closely adjacent to said fixed magnetic member, and second selectively operable means for establishing a second unidirectional magnetic field to interact with the field of said magnetized element to displace said displaceable element to one or the other of its stable states wherein one or the other of the poles of said magnetized element is closely adjacent said fixed magnetic member.

Caritato, U.S. Pat. No. 3,949,392 describes a display apparatus having a display surface formed by an array of contiguous elements which are rotatable about vertical shafts to display a surface of contrasting appearance to the background appearance of the display surface thereby forming a mosaic displaying information. A column of solenoid operated actuator devices is driven along the back of the display surface and selected devices operate to rotate selected ones of the elements in each vertical shaft. The elements have a generally cubic overall shape with their vertical surfaces being cylindrically concave to allow rotation of an element without causing movement of a contiguous element. The bottom surfaces of the elements are grooved and arranged so as to co-operate with fixed horizontal members to provide an indexing arrangement. In addition, vertically extending channels communicate with the bore of each element to allow rain water to flow freely down the display surface. To assist the flow the top of the elements can have a frusto-conical recess.

Romney, U.S. Pat. No. 4,006,476 describes a changeable display apparatus and method which is made up of a group of similar individual character modules, disposed in a substantially continuous viewing surface, each module comprising support panel or base and a set of identical and changeable elements so it can represent any desired one of a character group, e.g., any letter of the alphabet. Each display element comprises a molded two-piece housing body designed to pivotally support a rotatable magnetic display piece having a relatively visible light-showing or light-reflective face and a dark or non-visible face which can be moved selectively to a viewing position. Solenoid means individual for rotating each element show a desired face selectively, so that selected elements in any module as desired may be shifted either in unison, or preferably sequentially, to show individual display characters or symbols, such as a letter of the alphabet or an arabic numeral, etc. The light-showing face, per se, is designed preferably to operate essentially without electrical or other energy consumption. Access to mounting means for the elements on the base panel is provided by slightly truncating the corners of each housing body.

Bradshaw, U.S. Pat. No. 4,021,946 describes a sign display comprising a plurality of triangular display elements each having three display surfaces. The display elements are arranged along mutually perpendicular sets of axes to define a matrix display having a display plane. Rotary drive shafts extend through the display element parallel to the display surfaces, and each display element includes clutch structure comprising frustoconical clutch members received in frustoconical apertures formed in the display element and spring biased to normally coupled the display element for rotation with the drive shaft extending therethrough. Abutment surfaces corresponding to the display surfaces project from the lower end of each display element, and a stop arm is associated with each display element for selective actuation to terminate rotation of the display element with a predetermined display surface situated in the display plane. The first display surfaces all of the display elements may be utilized in combination to form a dedicated sign and the second and third display surfaces of each display element may comprise contrasting colors, in which case the second and third surfaces of the display elements are utilized to form a desired sign by means of a matrix display.

Romney, U.S. Pat. No. 4,197,527 describes an apparatus and method for presenting information over a display area, using a group of contiguous or substantially adjoining modules, which essentially cover the area. Each module is made up of contiguously arranged elements, capable of presenting alternatively either a luminous (highly visible) or a non-luminous (much less visible) aspect. By selectively operating or energizing chosen elements in groups within each module, characters or symbols are presented which, collectively over the group of modules, presents the information to be displayed. Each module comprises a mounting base and an associated printed circuit board, referred to as a satellite board, having conductive element connected to each element of the module so that each element may be activated or energized, or deactivated selectively. The modules, in turn, are mounted so that the satellite board is connected electrically to a higher order control master or major printed circuit board. The latter is controlled, in turn, by mechanical or electronic means to selectively energize or activate the desired elements in all the modules, thus to present the information to be displayed. Each element has an incandescent electric light or a rotatable part having luminous and non-luminous aspects. Accessory means for changing color or, surface texture or reflective characteristics, etc., can be applied to each element or in selected elements and/or modules; similarly, background surfaces appearing between elements may be changed in color, aspect, etc. Special combination connector conductor means are provided between individual elements and the module base and other connectors are provided between modules and larger units, including the necessary conductive components to connect electrically the master board or circuit with satellite or module circuits. Novel aspects of connector and mounting devices are an important feature of the invention.

Kluiters, U.S. Pat. No. 4,214,390 describes a decorative panel assembly which includes a backing or supporting panel and a second or facing panel spaced from the backing panel. The facing panel includes a plurality of circular apertures therein and a plurality of spheres are loosely held hostage between the panels, the spheres each having a portion extending through the apertures. The spheres are supported such that they are each freely rotatable, and one hemispherical portion of each of the spheres is one color and the other hemispherical portion of each of the spheres is a contrasting color. The decorative panels may be used to form a wall or large decorative surface incorporating a large number of the rotatable spheres and whereby visual patterns can be formed by rotating the respective spheres such that the desired colored portion of the sphere surface projects through the respective aperture.

Kent, U.S. Pat. No. 4,775,862 describes a display member comprising a housing having a chamber with a viewing face and a lamina member movably mounted within the chamber to be movable into a first position in which one face of the member is in face to face contact with the viewing face and a second position in which the one face of the member is out of contact with the viewing face and the other face is in face to face with a rear face of the chamber spaced rearwardly from the viewing face, a drive being provided to produce an attractive and/or repulsive force between the housing and the member to move the member from the first or second position to the other position wherein no external energy need be provided to maintain the member in the first or second position, an opaque fluid filling the chamber.

Black, U.S. Pat. No. 4,912,442 describes a display apparatus comprising a plurality of rotationally mounted display elements arranged into a matrix of rows and columns, the axes of rotation of said display elements being perpendicular to each associated column and parallel to each associated row, respectively, said display elements each including first and second display faces perpendicular to one another and joined along respective adjacent edges, for providing a desired arrangement of said display faces at the front of said display apparatus; first and second ramp surfaces are rigidly connected along inside edges of and extending substantially perpendicularly away from a back surface of said first and second faces, respectively, opposite the edges joining said first and second display faces, respectively; and an actuator assembly is mounted for bidirectional movement along a path perpendicular to the planes of rotation of said display elements at the rear of said display apparatus, for stroking selected ones of said first and second ramp surfaces with sufficient force to cause the associated display elements to rotate 90 degree for changing the pattern of associated first and second faces at the first of the display.

The prior art teaches a bi-stable electro-magnetically operated display member, decorative panel assembly, compressive information display system, changeable display apparatus, illuminated display apparatus, a stipple member, pulse scanned reflective display, scanned electromechanical alphanumeric display, multi-element changeable sign display, display apparatus with spheres mounted on rods, multi-element display apparatus for displaying different patterns or information, and a changeable indicator for display, but does not teach an electromagnetically operated, scanning Braille carriage scanning a membrane and adjusting Braille characters using a revolving belt. The present invention fulfills these needs and provides further related advantages as described in the following summary.

SUMMARY OF THE INVENTION

The present invention teaches certain benefits in construction and use which give rise to the objectives described below.

A Braille reading apparatus has a base unit presenting a planar upfacing surface, and a traveling Braille character carriage. A cover unit is engaged with the base unit and provides a flexible membrane covering the upfacing surface and the carriage. The character carriage is enabled for moving across the base unit and provides plural character read units in linear sequence between its opposing ends. Each of the read units provides Braille character presentation in contact with an underside of the membrane, whereby, a page of Braille is readable through tactile contact, moving between the opposing ends of the character carriage over an outside surface of the membrane, as the character carriage moves over the base unit scanning from one end to the other to simulate a page of Braille characters.

A primary objective of the present invention is to provide an apparatus and method of use of such apparatus that provides advantages not taught by the prior art.

Another objective is to provide such an invention capable of being programmed to present Braille text so that a single surface may be read repetitively as pages in a Braille book.

A further objective is to provide such an invention capable of electromechanically positioning Braille beads against an underside of a flexible membrane in accordance with an appropriate Braille text.

A still further objective is to provide such an invention capable of positioning the beads using a rotating belt or in an alternate embodiment, with electromagnetic repulsion and attraction.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is an exploded perspective view of the preferred embodiment of the invention;

FIG. 2 is a perspective view thereof in use;

DETAILED DESCRIPTION OF THE INVENTION

The above described drawing figures illustrate the invention in at least one of its preferred embodiments, which is further defined in detail in the following description.

Figure 3:
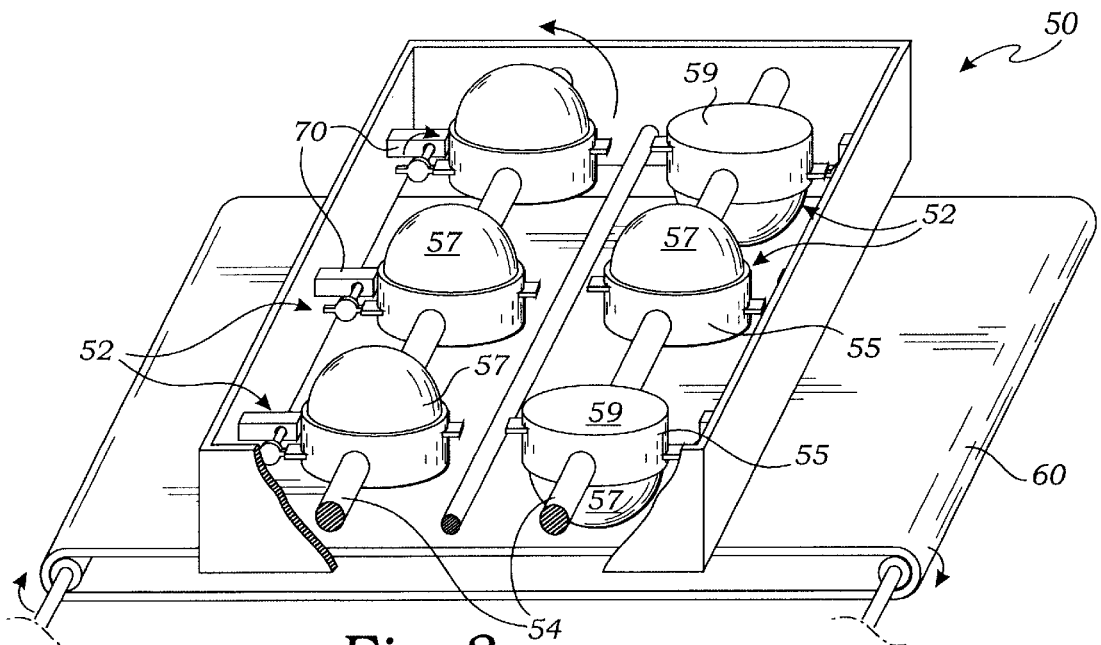
FIG. 3 is a perspective view thereof showing a read unit of the invention.

The present invention is a Braille reading apparatus providing a base unit 10 (FIG. 1) presenting a planar upfacing surface 20 and a traveling Braille character carriage 30 which is adapted for moving or scanning from one end 22 of the surface 20 to the other end 24. A cover unit 40 (FIG. 1) is engaged with the base unit 10 as shown in FIG. 2. The cover unit provides a flexible membrane 42 extensive over the upfacing surface 20 and is positioned in parallel therewith. The character carriage 30 is engaged for scanning as shown by the arrows in FIG. 1, by a means for scanning 32 such as a pulley system or rack and gear drive as are well known in the art. Such a drive is mounted in the base unit 10 as shown in FIG. 1 and may, for instance, comprise a small stepping motor with a drive cable or wire for moving the character carriage 30 to selected positions on the surface 20 as will be further described below. The character carriage 30 provides plural character read units 50, one of which is shown in FIG. 3. These read units 50 are positioned in linear sequence between opposing ends 30', 30" of the character carriage 30. Each of the read units 50 has a means for character presentation 52 (further referred to as a Braille bead assemblies) which is positionable in contact with an underside 44 of the membrane 42. In this manner a "page" of Braille characters is readable through tactile contact moving between the opposing ends 30', 30" of the character carriage 30 over an outer surface of the membrane 20, i.e., the surface visible in FIGS. 1 and 2, as the character carriage 30 moves over the base unit 10 between ends 22, 24.

In the preferred embodiment, each of the read units 50 comprises six Braille bead assemblies 52. As shown in FIG. 3, these assemblies 52 are mounted on shafts 54 for rotation. Each of the Braille bead assemblies 52 provides a support block 55 and extending from the support block 55 a dome 57. The support block 55 is mounted on axle or shaft 54, as shown, and is therefore rotationally positionable between an up-dome position and a down-dome position, both of which are shown in FIG. 3, wherein the up-dome position places the dome 57 into abutting contact with the undersurface 44 of membrane 20, and the down-dome position places a flat surface 59 of the support block in adjacent juxtaposition to the membrane 20 but spaced away from membrane 20.

Figure 4A:
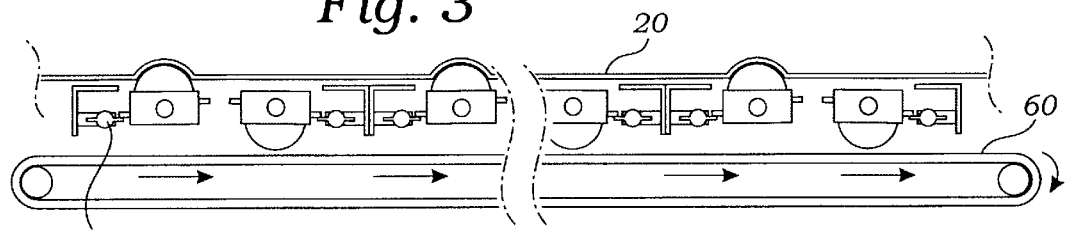
FIGS. 4A, 4B and 4C are side elevational views thereof showing a first embodiment of the invention in operation.
Figure 4B:
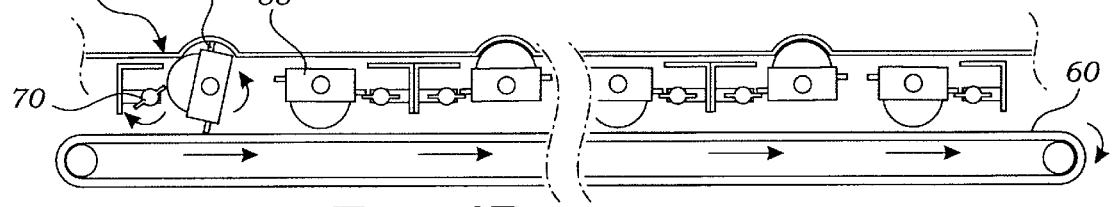
Figure 4C:
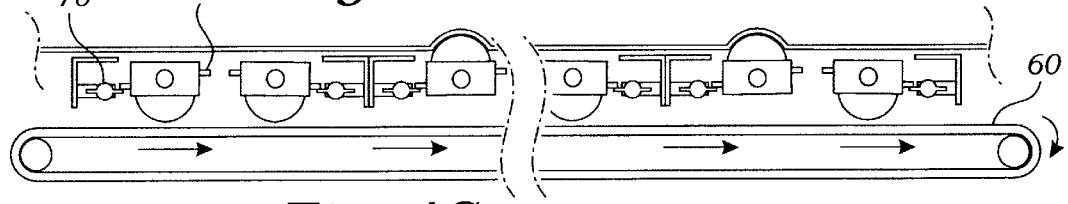

In one embodiment, shown in FIGS. 3–4C, a revolving belt 60 is positioned below the bead assemblies 52 and in near contact with them. This arrangement is adapted for moving the bead assemblies between the up-dome position (UDP) and the down-dome position (DDP) in accordance with an electro-magnetically operated release assembly 70. It should be noticed that the support block 55 provides a pair of tabs 56 extending outwardly from the block 55 on opposing sides thereof. When it is desired to move the bead assemblies from their current position to the alternate position, i.e., from UDP to DDP or from DDP to UDP, the release assembly 70 is actuated, by a solenoid actuator or similar device as is well known in the art, and therefore revolves, as shown by the arrow at the extreme left in FIG. 4B. This causes the block 55 to rotate, again as shown at the left in FIG. 4B and to be caught by moving belt 60 so as to be fully revolved to the alternate position. This sequence is fully illustrated at the left in FIGS. 4A, 4B and 4C where the bead assembly 52 is shown to move from the UDP to the DDP. The opposite movement is completed in like manner. In FIG. 4A it is shown that membrane 20 is pushed upwardly by each of the bead assemblies 52 which are rotated into the UDP. It would be within the skill of one routinely knowledgeable in the art to configure a circuit to enable the actuation of appropriate ones of the release assemblies 70 to configure each of the read units 50 in the sequence of such read units 50 on character carriage 30, to take on the form of Braille characters in the sequence. And it would therefore enable one to read the line of Braille characters across the character carriage 30 through the membrane 20. Upon completion of reading of one line of such Braille characters, the character carriage 30 moves downwardly on the base unit 10 and the Braille characters are changed to represent a next line of such characters on the membrane 20.

Figure 5A:
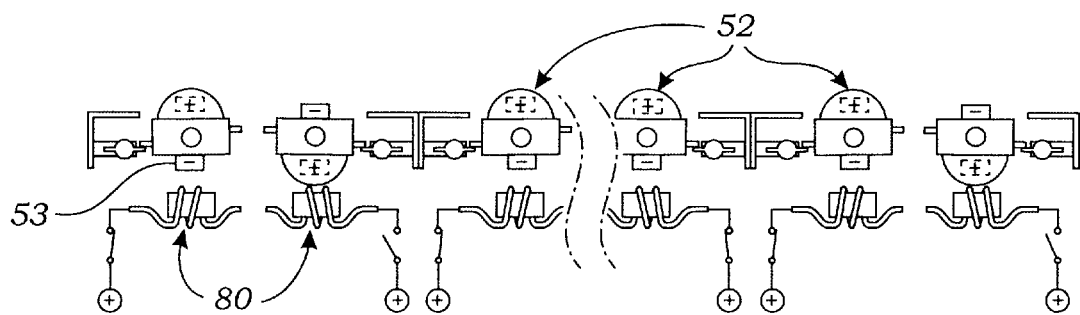
FIGS. 5A, 5B and 5C are side elevational views thereof showing a second embodiment of the invention in operation.
Figure 5B:
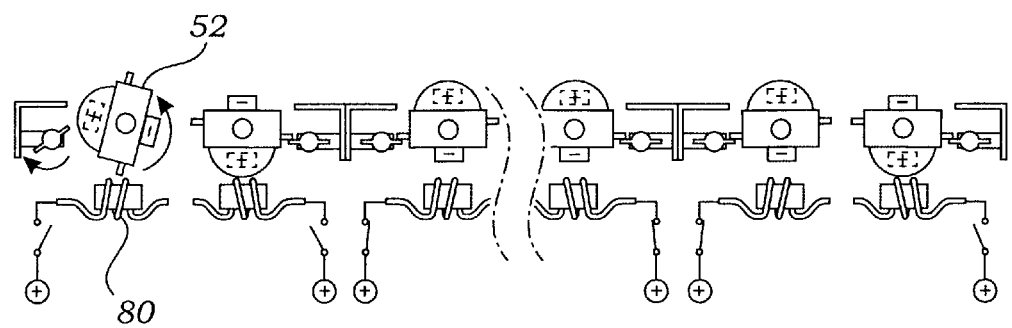
Figure 5C:
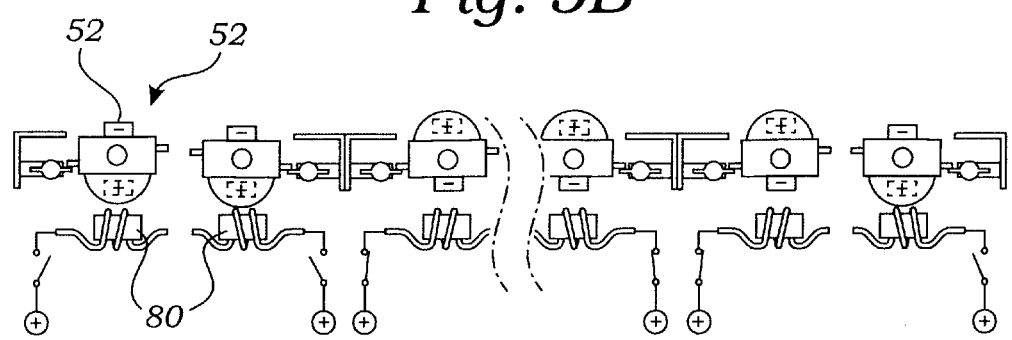

In a further embodiment, shown in FIGS. 5A–5C, each of the bead assemblies 52 further comprises a permanent magnet 53 attached thereto or alternately imbedded into the flat surface 59. An electromagnet 80 is positioned under each of the bead assemblies 52 and is thus enabled for repelling or attracting the permanent magnet 53 thereby rotating the bead assembly 52 between the UDP and the DDP depending upon which direction electrical current is caused to flow within the electromagnet circuit. Such is within the skill set of the routine electrical engineer, and to fabricate such a circuit. Again, when in position, the bead assembly 52 is held, positioned, or engaged by the release assembly 70. In this embodiment, the belt 60 is not used.

It is within the capability of one of skill in the art to provide the belt driving motor, the circuits for actuating the plural release assemblies 70 and the electromagnets 80.

In another use of the apparatus, the membrane 20 may be a surface that takes an imprint through contact therewith, such as carbon paper or the like. In this manner, the Braille characters may be imprinted onto the membrane by simple contact so as to be visually readable instead of through tactile contact.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A Braille reading apparatus comprising: a base unit presenting a planar upfacing surface and a traveling Braille character carriage; and a cover unit engaged with the base unit, the cover unit providing a flexible membrane extensive over the upfacing surface and positioned in parallel therewith; the character carriage engaged with a means for scanning of the character carriage across the base unit, the character carriage providing plural character read units in linear sequence between opposing ends of the Braille character carriage; each of the read units providing means for character presentation in contact with an underside of the membrane; whereby, a page of Braille is readable through tactile contact moving between the opposing ends of the character carriage over an outside surface of the membrane, as the character carriage moves over the base unit between ends thereof.

2. The apparatus of claim 1 wherein each of the read units comprises six Braille bead assemblies.

3. The apparatus of claim 2 wherein each of the Braille bead assemblies provides a support block and extending from the support block a dome, the support block mounted on an axle and rotationally positionable thereon and adapted for moving between an up-dome position and a down-dome position, wherein the up-dome position places the dome into abutting contact with the membrane, and the down-dome position places a flat surface of the support block in adjacent juxtaposition to the membrane.

4. The apparatus of claim 3 further comprising a revolving belt positioned below the bead assemblies and adapted for moving the support block between the up-dome position and the down-dome position in accordance with an electro-magnetically operated release assembly.

5. The apparatus of claim 3 wherein each of the bead assemblies further comprises a permanent magnet attached thereto, an electromagnet positioned under each of the bead assemblies and enabled for repelling and attracting the permanent magnet thereby rotating the bead assembly between the up-dome position and the down-dome position.

6. A display apparatus comprising: a base unit presenting a planar upfacing surface and a traveling character carriage; the character carriage engaged with a means for scanning of the character carriage across the base unit, the character carriage providing plural character read units in linear sequence between opposing ends of the character carriage; each of the read units providing means for character presentation; whereby, characters are visible on the character carriage; the characters being formed by rotational bead assemblies through one of a rotating belt and electromagnets.

7. The apparatus of claim 6 wherein each of the bead assemblies provides a support block and extending from the support block a dome, the support block mounted on an axle and rotationally positionable thereon and adapted for moving between an up-dome position and a down-dome position, wherein the up-dome position places the dome into a visable location.

* * * * *